[11] 3,551,710

| | |
|---|---|
| [72] Inventor | Meredith C. Gourdine<br>West Orange, N.J. |
| [21] Appl. No. | 794,273 |
| [22] Filed | Jan. 27, 1969<br>Division of Ser. No. 655,977, June 16, 1967, abandoned, which is a continuation-in-part of Ser. No. 477,516, Aug. 5, 1965, abandoned. |
| [45] Patented | Dec. 29, 1970 |
| [73] Assignee | Gourdine Systems, Incorporated<br>Livingston, N.J.<br>a corporation of Delaware |

[54] ELECTROGASDYNAMIC GENERATING SYSTEMS
5 Claims, 1 Drawing Fig.

[52] U.S. Cl............................................. 310/10,
310/6
[51] Int. Cl.............................................. H02n 3/00
[50] Field of Search............................................ 310/11, 5, 6

[56] References Cited
UNITED STATES PATENTS
2,004,352  6/1935  Simon ........................ 310/6

*Primary Examiner*—D. X. Sliney
*Attorney*—Brumbaugh, Graves, Donohue & Raymond

ABSTRACT: Electrogasdynamic systems operating in a stream of gas for obtaining a conversion between gaseous kinetic energy and electrical energy, in which two electrogasdynamic devices each comprised of ionizing electrodes and a collector electrode, separated by a dielectric channel wall, are electrically coupled regeneratively. In specific embodiments the collector electrode of each device is coupled to the ionizing electrode circuit of the other device through a resistive or reactive impedance to alternately change the polarity of electrical charges injected into the gas stream upon which each device operates.

PATENTED DEC 29 1970
3,551,710
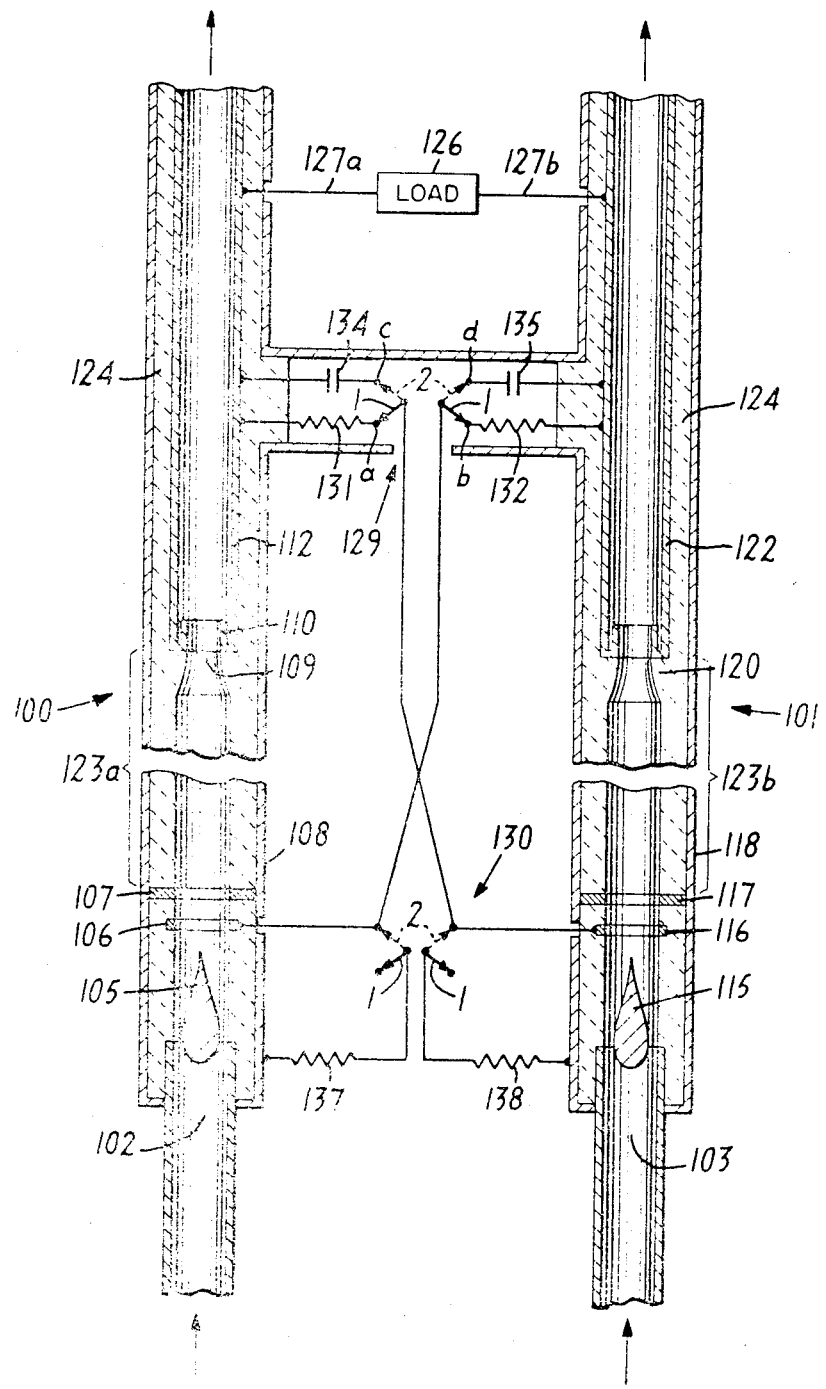
INVENTOR.
MEREDITH C. GOURDINE
BY
Brumbaugh, Graves, Donohue & Raymond
his ATTORNEYS 3,551,710

1

ELECTROGASDYNAMIC GENERATING SYSTEMS

CROSS REFERENCE TO RELATED APPLICATION

This application is a division of my copending application Ser. No. 655,977, filed Jun. 16, 1967, which, in turn, is a continuation-in-part of application Ser. No. 477,516, filed Aug. 5, 1965 both now abandoned.

BACKGROUND OF THE INVENTION

This invention relates to electrogasdynamic systems in which electrical energy from one electrogasdynamic device is coupled to another such device to control its operation. In specific embodiments two electrogasdynamic devices are intercoupled regeneratively to alternately reverse the polarity of electrical power extracted from output electrodes associated with each device.

Conventional power generating stations, whether local or central, generate direct and alternating current potentials of relatively low-voltage, usually not exceeding several thousand volts. Many specialized needs, however, both experimental and practical, require electrical potentials exceeding tens of thousands of volts, and it is to those needs that the present invention is believed most attractive. Because of the simplicity of the present systems, both alternating and direct current voltages can be developed at lower equipment costs and with greater safety than in more conventional systems.

In conventional electricity generating machinery, the technical problems increase with increasing generated potentials, primarily because conductors and other parts of the machine must be designed to withstand electric breakdown at high operating potentials. In the electrogasdynamic systems disclosed herein, however, output potentials are distributed internally of the generating apparatus in such a manner that dielectric breakdown tendencies are substantially reduced or eliminated. For example, in electrogasdynamic generators, the output potential is distributed throughout the length of a dielectric gas channel to keep the longitudinal voltage gradient below the dielectric breakdown potential of the operating gas, and only the elements receiving the output potential externally of the generator need be adequately insulated.

It is therefore among the primary objects of the present invention to introduce systems operating on a gas stream for generating high electrical potentials.

A further object of the invention is to provide systems for high-voltage generation that have minimum complexity.

Further objects of the invention are to generate in a new arrangement of plural electrogasdynamic devices both alternating and direct current power, and to provide new electrogasdynamic systems for research and other specialized needs.

SUMMARY OF THE INVENTION

Briefly, the invention accomplishes the foregoing objects in a system in which plural electrogasdynamic devices are intercoupled to return a portion of generated electrical power at one device to the exciting circuit of another device. Both devices may be identical to include exciting electrodes for producing charge carriers in a dielectric channel to be carried by a gas stream to a downstream collector electrode upon which an output potential appears. In preferred embodiments, output power from one device is coupled to another device through a resistive or relaxation impedance network, adequately insulated, to the ionizing electrodes of the other device.

BRIEF DESCRIPTION OF THE DRAWING

For a better understanding of the invention and its objects and advantages, reference should be made to the following detailed description of an exemplary embodiment and the drawing, in which:

2

FIG. 1 is a cross-sectional elevation view of a pair of electrogasdynamic devices forming a unitary system according to the invention.

DESCRIPTION OF THE PREFERRED EMBODIMENT OF THE INVENTION

Referring now to the drawing, there is shown an electrogasdynamic system for generating AC and DC power. The system comprises a pair of electrogasdynamic converters 100 and 101, each of which provides a flow path for an ionizable fluid received at its respective inlet 102, 103. Considered independently, each converter operates in accordance with the principles disclosed in my copending application Ser. No. 389,360, filed Aug. 13, 1964, now U.S. Pat. No. 3,452,225, and those discussed in connection with FIG. 2 of the parent application Ser. No. 655,977, mentioned above.

The left-hand converter 100 includes a nozzle-forming corona electrode 105, an attractor electrode 106, and a shielding electrode 107. As discussed in the copending application (Ser. No. 389,360) noted above, the shield electrode 107 shields the electric field in the vicinity of the electrodes 105, 106 from the influence of the downstream electric field, and is electrically connected to the outer casing 108 of the generator. Flowing downstream, the fluid passes through an opening 109 formed by an annular particle-collecting section 110, and thereafter into the precipitator-collector 112.

The right-hand generator is comprised of similar elements, i.e., corona, attractor, and shield electrodes 115, 116, and 117, respectively, an outer casing 118, a particle collecting section 120, and a precipitator-collector electrode 122. The nozzles formed between the corona electrodes 105, 115 and the boundary of the respective flow paths are preferably dimensioned to induce subsonic accelerated flow downstream thereof, as in the case of the devices discussed in the noted patent applications. The sections 123a, 123b between shield electrodes 107, 117 and the collector electrodes 112, 122 comprise the converter generator sections in which exist the axial fields against which the fluid does work in effecting the conversion, according to well-understood principles of voltage generation. The working elements of the left- and right-hand converter sections are suitably insulated with a dielectric material 124 to prevent voltage breakdown between the various electrodes. This material could be, for example, the smoke stack of a power generating station. Provisions are made for connecting a load 126 to the leads 127a and 127b which are, in turn, connected to the precipitator-collector electrodes 112 and 122, respectively.

The converters are interconnected through an impedance and switching network which permits operation of the converters to produce either AC or DC power. For DC operation, the switches 129 and 130 are in position 1, as shown, thereby connecting the resistances 131 and 132, through switch contacts 129a and 129b, between the precipitator-collector electrodes 112, 122 and the attractor electrodes 116, 106, respectively. A capacitor 134 is connected between the precipitator-collector electrode 112 of the left-hand converter and the switch contact 129c. Similarly, a capacitor 135 is connected between the precipitator-collector electrode 122 of the right-hand converter and the switch contact 129d.

The resistors 137 and 138 are connected at one end to their respective corona electrodes 105, 115 through the conductive casings 108, 118 of the left-and right-hand converters. The other ends of these resistors feed the movable contacts of the switch 130. When the switches 129 and 130 are in position 2, indicated by the broken lines, AC operation of the system results.

The DC operation of the generator system of FIG. 1 may be described as follows. An ionizable fluid is passed through each converter and is ionized as it flows through the ionizing field between the attractor and corona electrodes. The ions produced thereby flow downstream through the particle collecting sections and into the precipitator-collector sections.

There, the ions collect on the precipitator-collector electrodes 112, 122 by reason of the space charge fields, and a voltage builds up at these electrodes. Let us assume that initially the attractor electrodes 106, 116 are at a small positive potential with respect to their respective corona electrodes 105, 115 and that the fluid passing through each converter contains a number of negative ions. Consequently, negative voltages begin to build up at the collector electrodes 112 and 122 as the ions transfer their charges to those conductive portions of the converter.

Considering only the left-hand converter now, the negative voltage at the collector electrode 112 is coupled, with the switches 129 and 130 in position 1, to the attractor electrode 116 of the right-hand converter 101. If we further assume a slight imbalance in the ion content of the fluid passing through the converters, such that the voltage at the collector electrode 112 tends to be more negative than the collector electrode 122, the attractor electrode 116 will quickly assume a negative voltage with respect to the corona electrode 115. The corona electrode 115 therefore begins to emit positive ions which, like the negative ions in the left-hand converter 100, are swept downstream and collected on the collector electrode 122, and the accumulation of positive charge creates a positive potential at that electrode. That positive potential, in turn, is coupled through the resistor 132 and switches 129, 130 to the attractor electrode 106 of the left-hand converter 100, thereby tending to increase the potential difference between the attractor electrode 106 and the corona electrode 105.

This action continues until limiting factors stabilize the ultimate potential at the collector electrodes 112 and 122. The right-hand converter 100 now furnishes a high positive voltage to one side of the load 126, whereas the left-hand converter 101 supplies a high negative voltage to the other side of the load 126. The total voltage across the load is, of course, the algebraic difference between those voltages, which is double the voltage from a single converter assuming identical parameters in each converter. Moreover, the higher voltage is obtained without additional dielectric shielding or other special breakdown-preventative measures for each generating device. Only elements 129 and 131—135 need be protected against sparkover at the higher operating potential.

If the switches are positioned (to position 2) for AC generation, the capacitors 134 and 135 replace the resistors 131 and 132 as the impedance coupling between the collector electrodes 112, 122 and the respective attractor electrodes 116, 106. The resistors 137 and 138 are now also coupled to their respective attractor electrodes 106, 116. With this arrangement the system oscillates much in the same manner as an electronic multivibrator circuit, voltage changes at the collector electrodes being capacitively coupled to the attractor electrodes.

For example, assuming a negative potential at the collector electrode 112 and a positive potential at the collector electrode 122, and assuming further that a perturbation in the left-hand converter 100 occurs, tending to make the potential at the collector electrode 112 less negative, a positive voltage signal corresponding to this change is coupled to the attractor electrode 116. This renders the attractor electrode 116 more positive relative to the corona electrode 115. The corona electrode 115 consequently emits fewer positive electrons, the effect of which is to lower the positive voltage at the collector electrode 122. This reduction in positive potential at the electrode 122 is a negative-going change which is coupled through the capacitor 135 to the attractor electrode 106 which now becomes less positive with respect to the corona electrode 105. The corona electrode 105 therefore emits fewer negative ions, and the potential at the collector electrode 112 decreases still further.

This regenerative process continues until the collector electrodes 112 and 122 eventually switch polarity and a stable operation point (corresponding to the peak of the AC voltage) is reached as in the case of DC operation. At this point the absolute voltages at each of the attractor electrodes 106 and 116 begin to fall, thus beginning the second half of the AC cycle. The AC frequency of the system is determined by the RC time constant of the resistor 138 and the capacitor 134 and by the RC time constant of resistor 137 and the capacitor 135. Although the operation of the system is analogous to an electronic multivibrator, it is not identical, since the converters conduct both negative and positive charges, whereas the active elements in an electronic multivibrator conduct only electrons.

The foregoing embodiment of the invention should be considered as representative only, particularly as to its physical details, and many modifications are therefore possible within the skill of the art. For example, it is apparent that the collector electrodes of the individual converters can assume different geometries and that the preferred shield electrode may be omitted without loss of operation. It is moreover anticipated that the elements coupling the electrical circuits of the converters may be surrounded or immersed in a suitable material of high dielectric strength, such as oil, to foreclose sparking. Accordingly, all such variations and modifications are intended to be included within the scope of the appended claims and the inventions should not be considered limited, except by the express terms of those claims.

I claim:

1. Apparatus for converting the kinetic and potential energies of a flowing gas into electrical energy, comprising:
   first and second flow tube means defining flow paths for the gas;
   first and second charging electrode means for producing charge carriers in the respective flow paths, each of said charging electrode means having a corona electrode and an attractor electrode located to create a corona discharge in a respective flow tube;
   first and second collector electrode means for collecting the charges carried by the gas to produce electrical energy; and
   electrical regenerative means for returning a portion of the electrical energy developed at said first and second collector electrodes to said second and first charging electrode means, respectively, to maintain production of said charge carriers, said electrical regenerative means having capacitive reactance means coupling said first and second collector electrode means, respectively, and an impedance connected between the attractor and corona electrodes of each of said charging electrode means.

2. Apparatus for converting the kinetic and potential energies of a flowing gas into electrical energy, comprising:
   first and second flow tube means defining flow paths for the gas;
   first and second charging electrode means for producing charge carriers in the respective flow paths;
   first and second collector electrode means for collecting the charges carried by the gas to produce electrical energy, each of said collector electrodes having a cylindrical conductive member surrounding the flow downstream of the charging electrode means; and
   returning a portion of the electrical energy developed at said first and second collector electrodes to said second and first charging electrode means, respectively, to maintain production of said charge carriers; and
   means defining a convergent nozzle downstream of the electrode means in each flow path and having a minimum cross-sectional dimension, normal to the flow that is less then the corresponding dimension of the collector electrode; and
   capacitive reactance means coupling said first and second collector electrode means with the attractor electrode of said second and first charging electrode means, respectively, and an impedance connected between the attractor and corona electrodes of each of said charging electrode means.

3. System for converting the kinetic energy of a gas stream into electrical energy, comprising:

first and second electrogasdynamic generator means each including means to define a flow path for a gas stream, electrical discharge electrode means at an upstream end of the flow path for producing charge carriers in the stream, and collector electrode means at a downstream end of the flow path and spaced from the discharge electrode means by a dielectric medium to collect charges carried by the stream and thereby develop an electrical potential; and means for coupling the potential at the collector electrode of each electrogasdynamic apparatus to the discharge electrode means of the other apparatus, said means for coupling having a relaxation circuit to establish a periodic electrical potential at the respective electrode means, thereby to result in a periodic potential at the collector electrode means of at least one electrogasdynamic apparatus.

4. System as set forth in claim 3, further comprising:
a direct current conductive circuit connected to each respective collector electrode means; and
switch means for selectively disabling the relaxation circuit and coupling the direct current circuit of each apparatus to produce direct current potentials of apposite polarity at the respective collector electrode means.

5. In a method for generating a periodic electric potential, the steps of:
flowing a concentration of charges in a gas stream against a charge-repelling field in at least two flow paths;
collecting charges carried by the stream to develop for each flow path an electrical potential; and
utilizing the electrical potential developed from each flow path to produce a periodic variation in the charge concentration in the respective other flow path.